United States Patent [19]

Prat

[11] 4,079,787
[45] Mar. 21, 1978

[54] ROTOR SHAFT DRIVE MECHANISM FOR ROTARY CULTIVATORS

[76] Inventor: Angel Gallach Prat, Autovia de Castelldefels km. 7,5, Prat de Llobregat (Barcelona), Spain

[21] Appl. No.: 783,629

[22] Filed: Apr. 1, 1977

[51] Int. Cl.² .................... A01B 33/02; A01B 33/08
[52] U.S. Cl. ................................... 172/125; 172/123
[58] Field of Search ............... 172/125, 118, 119, 123, 172/42, 43, 96

[56] References Cited

U.S. PATENT DOCUMENTS

| 1,074,263 | 3/1929 | Scheckler | 172/125 X |
| 2,908,337 | 10/1959 | Surprise et al. | 172/125 X |
| 3,352,367 | 11/1967 | Honda et al. | 172/96 |

FOREIGN PATENT DOCUMENTS

| 1,130,095 | 9/1956 | France | 172/43 |
| 1,376,520 | 9/1964 | France | 172/42 |
| 1,107,441 | 5/1961 | Germany | 172/43 |
| 467,572 | 1/1969 | Switzerland | 172/123 |
| 903,482 | 8/1962 | United Kingdom | 172/123 |

Primary Examiner—Paul E. Shapiro
Attorney, Agent, or Firm—Staas & Halsey

[57] ABSTRACT

Drive shaft for a transmission system located at a point remote from the end of the rotor shaft of an agricultural cultivating machine, and having a crank portion, similar to that of a crankshaft, the gap of which coincides synchronously in rotation with the axially extending arms of said rotor shaft blades which are mounted in sets on respective planes adjacent each side of said transmission system, said synchronous operation being attained by appropriate setting of the gear ratio of this system in terms of the number of blades mounted in said planes.

1 Claim, 3 Drawing Figures

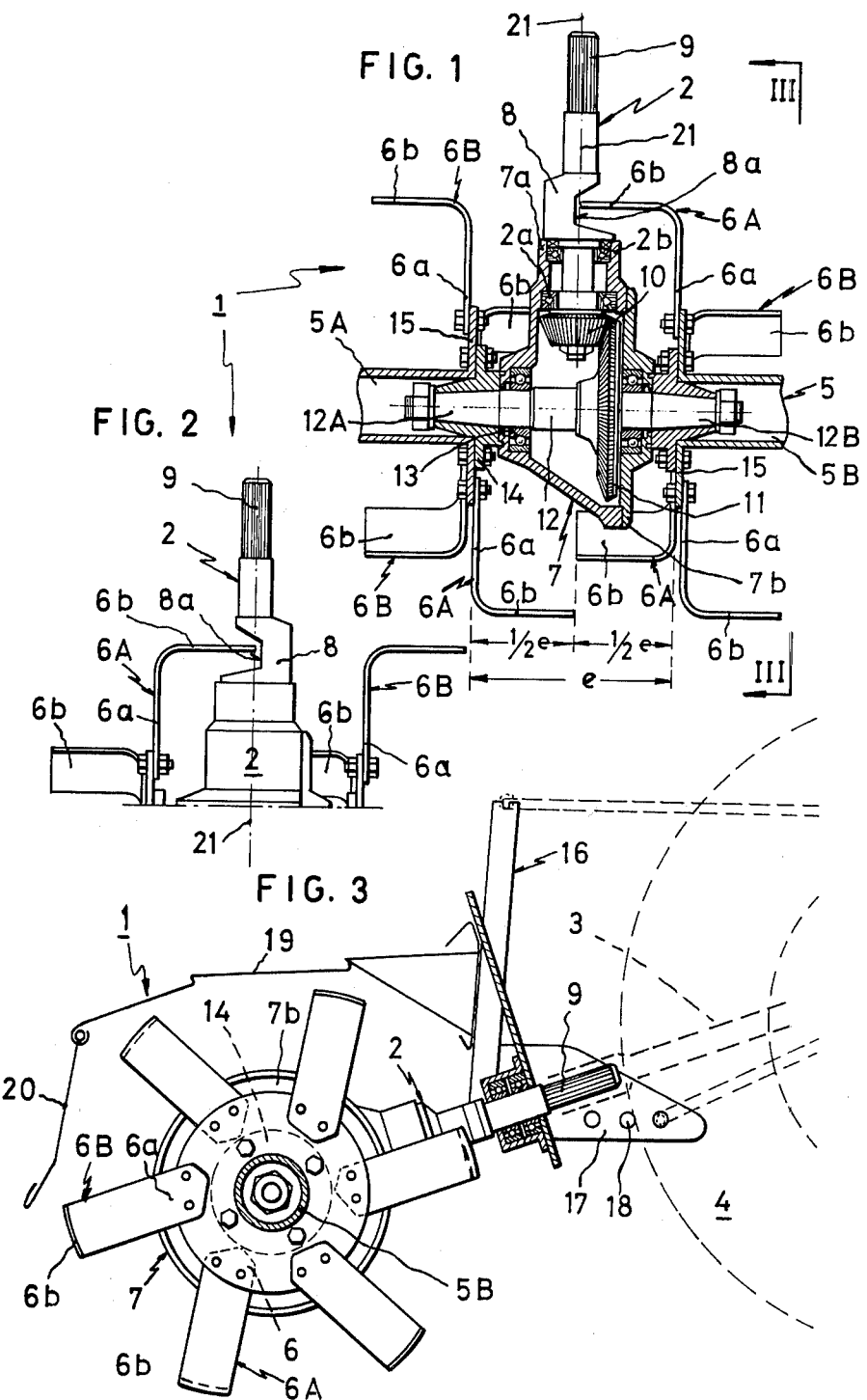

ROTOR SHAFT DRIVE MECHANISM FOR ROTARY CULTIVATORS

BACKGROUND OF THE INVENTION

1. Field of the invention

The present invention relates to rotary cultivators and more particularly to a rotor shaft drive mechanism for rotary cultivators which are arranged to be hung, in service, from the rear of an agricultural tractor and be driven by direct application of the tractor power to the rotor shaft through a conventional geared power take-off system, said rotor shaft carrying the blades which work and lighten the earth in the fashion of hoes.

2. Description of Prior Art

Cultivating machines of the prior art with the transmission system mounted at a point along the rotor shaft have the disadvantage that the two sets of blades immediately adjacent the transmission system housing have their axially extending arms spaced further apart than the spacing between any two adjacent sets of the remaining sets of blades, whereby a strip of unploughed earth is left between the said two sets of blades adjacent the housing.

SUMMARY OF THE INVENTION

An object of the invention is to provide for the drive of the rotor shaft at any point along its length without this interfering in the normal, regular operation of all the blades, including the two sets immediately adjacent the transmission system housing.

According to the invention the shaft coupled to the tractor power take-off and which drives the input gear of the transmission system, is provided with a crank portion, the gap portion of which coincides with the axially extending arms of the two sets of blades arranged in respective planes adjacent each side of the transmission system, this crank portion being positioned synchronously with the passage of said axially extending blade arms in front of the true axis of said drive shaft, to which end the ratio between the transmission gears must depend on the number of blades arranged in each working plane.

The invention will be better understood from the following description taken with reference to the accompanying drawings which illustrate by way of example a preferred, though not exclusive, embodiment which the invention may assume in practice.

BRIEF DESCRIPTION OF THE DRAWINGS

FIG. 1 is a plan view in section, of an arrangement for driving the rotor shaft of rotary cultivators in accordance with a preferred embodiment of the invention;

FIG. 2 is a detail of the crank portion forming part of FIG. 1 showing this portion in a diametrically opposed position; and FIG. 3 is a view of a rotary cultivator equipped with the improved drive system of the invention, taken along the line III—III of FIG. 1.

DETAILED DESCRIPTION OF THE PREFERRED EMBODIMENT

With reference now to the drawings and to FIG. 1 in particular, there is shown a system for driving the rotor shaft in a rotary cultivator, denoted generally with the reference numeral 1, having a drive shaft 2 adapted for coupling to a power take-off 3 of an agricultural tractor 4 (FIG. 3) carrying said rotary cultivator 1, for driving the rotor shaft 5. Said rotor shaft 5 carries blades 6 for working the earth and is driven through a transmission gear system contained in a housing 7 comprising a body 7a equipped with means (not shown) for attachment to the conventional hydraulic suspension mechanism of the tractor, and a cover 7b.

The drive shaft 2, mounted in bearings 2a and 2b has, at its outer end, a crank portion 8 and a grooved portion 9 whereby it is coupled to the power take-off 3 of the tractor 4, whilst the inner end thereof is attached to a bevel pinion 10 which engages with a crown wheel 11 attached to a driven shaft 12. Said shaft 12 is mounted in two bearings 13 and has two external flanges 14 attached to hubs 12A and 12B. The two tubular portions 5A and 5B forming the rotor shaft 5 are attached to said flanges 14.

As may be seen from the FIG. 1, the blades 6A and 6B comprise a root portion 6a extending radially with respect to the axis of the rotor shaft 5 and attached to a plate 15 by way of nuts and bolts or other conventional fixing means. The plate 15 is in turn fixedly attached to said rotor shaft 5. The blades 6A and 6B also have an arm portion 6b extending axially with respect to said rotor shaft 5 from the distal end of said root portion 6a. In the Figure, the blades immediately adjacent the housing 7 and having their arms 6b directed inwardly towards each other towards the housing 7 have been denoted with the reference numeral 6A, whereas all the remaining blades, both those which are placed in back-to-back relationship with the blades 6A, and those carried by all the other plates 15 mounted to the rotor shaft 5, have been denoted with the reference numeral 6B.

Likewise, the rotary cultivator 1 is equipped with a frame 16 for attachment thereof to the hydraulic suspension mechanism of the tractor 4, said frame engaging with a lower coupling plate 17 having holes 18 for adjusting the position at the tractor fixed support portion.

Finally, the rotor shaft 5 and associated blades 6 are conventionally covered by a roof plate 19 and fold-down rear skirt 20, the purpose of which is to avoid stones and earth form being thrown out of the machine.

The essential feature of the invention lies in the fact that the drive shaft 2 has a crank portion 8, after the fashion of a crankshaft, to provide a passage for the axially extending arm portion 6b of the two sets of blades 6A by way of synchronised opposition of said arms 6b with the gap 8a of said crank portion 8. To this end, the arrangement is such that the rotary movement of the crank portion 8 is synchronised with the passage of the arms 6b of the two sets of blades 6A so that, with the blades 6A of one set angularly displaced in uniform degree with respect to the blades of the other set, the passage of each of them with its arm 6b cutting the true axis 21 of the drive shaft, coincides with the gap portion 8a of said crank portion, in other words, the motor shaft 2 and rotor shaft 5 rotate in correct relationship due to the ratio of the bevel pinion 10 to the crown whell 11 which in turn is determined by the number of blades 6A mounted on each plate 15.

In this way, the two sets of blades 6A jointly cover the whole of the intermediate space e of earth to be worked lying below the vertical projection of the housing 7, half of said space corresponding to each set of blades, whereby there is no portion of earth left unworked directly by the blades 6A in said space.

Therefore, the housing 7 does not represent any obstacle and may be mounted at any point along the rotor shaft 5, although it is preferably mounted in the centre since this is the most favourable mechanical position.

What I claim is:

1. In a rotary cultivating machine which is mounted to the rear portion of an agricultural tractor, the tractor power being transmitted directly to the rotor shaft by a conventional transmission gear mechanism, the blades which work the earth being mounted to said shaft after the fashion of hoes, the improvement wherein the shaft coupled to the tractor power take-off and which drives the input gear of the transmission mechanism is provided with a crank portion, the gap of which coincides with the axially extending arm portions of the two sets of blades disposed in respective planes adjacent each side of said transmission system, said crank portion being positioned synchronously with the passage of such axially extending arm portions in front of the true axis of said drive shaft, the ratio of the transmission gears depending on the number of blades disposed in each working plane.

* * * * *

UNITED STATES PATENT AND TRADEMARK OFFICE
CERTIFICATE OF CORRECTION

PATENT NO. : 4,079,787
DATED : March 21, 1978
INVENTOR(S) : Angel Gallach Prat

It is certified that error appears in the above—identified patent and that said Letters Patent are hereby corrected as shown below:

Please insert the foreign application priority data as follows:

April 6, 1976   Spain ....................... 446.952

Signed and Sealed this

Sixth Day of February 1979

[SEAL]

Attest:

RUTH C. MASON
Attesting Officer

DONALD W. BANNER
Commissioner of Patents and Trademarks